(12) United States Patent
Choi et al.

(10) Patent No.: US 8,483,503 B2
(45) Date of Patent: Jul. 9, 2013

(54) METHOD AND APPARATUS FOR GENERATING THUMBNAIL IMAGE

(75) Inventors: Kwang-Pyo Choi, Anyang-si (KR); Yun-Je Oh, Yongin-si (KR); Young-Hun Joo, Yongin-si (KR)

(73) Assignee: Samsung ELectronics Co., Ltd., Samsung-ro, Yeongtong-gu, Suwon-si, Gyeonggi-do ( * ) Notice: Subject to any disclaimer, the term of this patent is extended or adjusted under 35 U.S.C. 154(b) by 1037 days.

(21) Appl. No.: 12/360,180

(22) Filed: Jan. 27, 2009

(65) Prior Publication Data
US 2009/0196523 A1    Aug. 6, 2009

(30) Foreign Application Priority Data
Feb. 4, 2008   (KR) .................. 10-2008-0010969

(51) Int. Cl.
*G06K 9/66* (2006.01)
(52) U.S. Cl.
USPC ........................................... 382/255; 382/233
(58) Field of Classification Search
None
See application file for complete search history.

(56) References Cited

U.S. PATENT DOCUMENTS

| | | | |
|---|---|---|---|
| 7,239,347 B2 * | 7/2007 | Yamamoto et al. | 348/231.2 |
| 7,469,064 B2 * | 12/2008 | Furuya et al. | 382/195 |
| 7,522,195 B2 * | 4/2009 | Yamamoto et al. | 348/231.2 |
| 7,821,545 B2 * | 10/2010 | Sato | 348/222.1 |
| 8,064,710 B2 * | 11/2011 | Mizoguchi | 382/233 |
| 2003/0117511 A1 * | 6/2003 | Belz et al. | 348/333.11 |
| 2005/0073594 A1 * | 4/2005 | Tagawa | 348/231.3 |
| 2006/0120618 A1 * | 6/2006 | Mizoguchi | 382/255 |
| 2007/0070087 A1 * | 3/2007 | Sato | 345/619 |
| 2007/0196027 A1 | 8/2007 | Lin et al. | |
| 2008/0074531 A1 * | 3/2008 | Ide et al. | 348/346 |
| 2008/0247462 A1 * | 10/2008 | Demos | 375/240.03 |
| 2012/0081385 A1 * | 4/2012 | Cote et al. | 345/589 |

FOREIGN PATENT DOCUMENTS

JP    2007-210108 A    8/2007

OTHER PUBLICATIONS

Samadani, Ramin, et al.; "Representative Image Thumbnails For Good Browsing;" IEEE International Conference, Image Processing 2007, ICIP 2007; Sep. 1, 2007; XP031157894.
Caviedes, Jorge, et al; "No-Reference Sharpness Metric Based on Local Edge Kurtosis;" Proceedings/2002 International Conference on Image Processing, IEEE Operations Center, Piscataway, NJ,vol. 3; Sep. 22, 2002; XP010607508.
Fischer, Jan, et al.; "Enhanced Visual Realism by Incorporating Camera Image Effects;" Mixed & Augmented Reality IEEE/ACM International Symposium; Oct. 1, 2006; XP031014671.

* cited by examiner

*Primary Examiner* — Nancy Bitar
(74) *Attorney, Agent, or Firm* — Cha & Reiter, LLC

(57) ABSTRACT

A method and apparatus for generating a thumbnail image are provided so that the out-of-focus (OOF) information can be ascertained from looking at the thumbnail. An input image is decoded, and a degree of the amount of OOF of the decoded image is measured (OOF information). There is a determination as to whether or not there is an EXchangeable Image File (EXIF) information about the input image. In the presence of EXIF information, a thumbnail image is extracted from the EXIF information and as much an OOF effect is applied to the thumbnail image in accordance with the degree of OOF. In the absence of the EXIF information, a thumbnail image is generated by scaling down the decoded image at a down scaler and applying as much of an OOF effect is applied to the thumbnail image in accordance with the degree of OOF.

18 Claims, 5 Drawing Sheets

METHOD AND APPARATUS FOR GENERATING THUMBNAIL IMAGE

CLAIM OF PRIORITY

This application claims the benefit of priority under 35 U.S.C. §119(a) from a Korean Patent Application filed in the Korean Intellectual Property Office on Feb. 4, 2008 and assigned Serial No. 2008-10969, the entire disclosure of which is hereby incorporated by reference in its entirety.

BACKGROUND OF THE INVENTION

1. Field of the Invention

The present invention generally relates to systems and method for using thumbnail images. More particularly, the present invention relates to a method and apparatus for acquiring Out-Of-Focus (OOF) information about an image and representing the OOF information in a thumbnail image.

2. Description of the Related Art

In general, as more files are stored in a system, more time and more effort are taken in order to search for an intended file. To reduce the inconvenience, a plurality of thumbnail images for still images can be displayed at the same time in one screen page. The use of thumbnails of images enables a user to detect information about stored images more easily and faster in the case of a mobile terminal having a relatively small capacity and a relatively slow processing speed, or a program that stores and manages a plurality of image files. In this context, a function for representing image files as thumbnails has become a necessity.

FIG. 1 is a block diagram of a conventional thumbnail image generator. Referring to FIG. 1, the conventional thumbnail image generator includes an EXchangeable Imagefile Format (EXIF) parser 110, a thumbnail selector 120, an image decoder 130, and a down scaler 140.

The EXIF parser 110 extracts a thumbnail image from EXIF information about a received image.

The thumbnail selector 120 selects one of the thumbnail image extracted from the EXIF information or a thumbnail image created by image decoding.

The image decoder 130 decompresses a compressed image, such as a Joint Photograph Experts Group (JPEG) image.

The down scaler 140 generates the thumbnail image by scaling down the size of the decoded image.

When creating a thumbnail image in the above thumbnail image generator, upon receipt of a image bit stream compressed a format such as JPEG, it is determined whether there is EXIF information about the bit stream. In the presence of the EXIF information, a thumbnail image is generated from an image included the EXIF information in the EXIF parser 110. In the absence of the EXIF information, the received image is decoded in the image decoder 130 and a thumbnail image is generated by scaling down the size of the decoded image in the down scaler 140.

In a portable terminal, a user can easily view all images on page through their display via thumbnails. Hence, the thumbnails should reflect the characteristic of their original images. Conventional thumbnails, which provide a rough view of the original images, are lacking in that they do not provide any indication of important characteristics of the images, i.e. focus information. This shortcoming is attributed to an effect resulting from conventional thumbnail creation. That is, when an original image is scaled down, its subtlety is gone and accordingly, its focus information is also missing.

Moreover, an out-of-focus image is subject to user amendment or deletion. In the conventional technology, focus information about an image is not known when the image is in a thumbnail state and thus the image needs to be displayed to a full size on a screen to reveal the focus information.

Therefore, the user inconveniently invokes an original image to amend, without amending or deleting the image in a thumbnail state. Accordingly, there exists a need in the art for a technique for reflecting focus information about an original image in its thumbnail so that the user can detect the focus information about the image and thus select and amend the image in the thumbnail state.

SUMMARY OF THE INVENTION

An aspect of the present invention is to provide a method for generating a thumbnail image so that out-of-focus (OOF) information about an original image can be detected even when it is being represented as a thumbnail.

In accordance with an exemplary aspect of the present invention, there is provided a method for generating a thumbnail image, in which an input image is decoded, an OOF degree of the decoded image is measured, and there is a determination as to whether or not there is EXIF information about the input image, a thumbnail image is extracted from the EXIF information and as much an OOF effect as the OOF degree is applied to the thumbnail image, in the presence of the EXIF information, and a thumbnail image is generated by scaling down the decoded image at a down scaler and an OOF effect as much as (in proportion with) the OOF degree is applied to the thumbnail image, in the absence of the EXIF information. The proportion may be the same amount.

To measure the OOF degree, the decoded image is converted to a Gray image (i.e. grayscale image), edge detection is performed on the gray image, an edge image obtained by dividing the edge detection into blocks (which may number 8×8), and the number of 8×8 blocks with edges is counted as a first count, DCT is performed on the 8×8 blocks, the number of DCT coefficients is counted as a second count, the number of coordinate positions with DCT coefficients being non-zeros in the 8×8 blocks are counted as a third count, and the OOF degree is calculated using the first, second and third counts.

In accordance with another exemplary aspect of the present invention, there is provided an apparatus for generating a thumbnail image, in which an EXIF parser extracts a thumbnail image from EXIF information about an input image, a thumbnail selector selects one of the thumbnail image extracted from the EXIF information and a thumbnail image generated by image decoding, an image decoder decodes a compressed image to a decompressed image, a down scaler generates the thumbnail image by scaling down the size of the decoded image, an OOF detector measures an OOF degree of the decoded image, and an OOF generator applies, for example, as much an OOF effect as the OOF degree to the thumbnail image.

BRIEF DESCRIPTION OF THE DRAWINGS

The above features and advantages of certain exemplary aspects of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION

The matters defined in the description such as a detailed construction and elements are provided for illustrative purposes to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions may be omitted for clarity and conciseness when their inclusion might obscure appreciation of the present invention by a person of ordinary skill in the art.

Exemplary embodiments of the present invention illustrate and do not limit a method for generating a thumbnail image such that OOF information about its original image can be detected from the thumbnail image.

Figure 1:
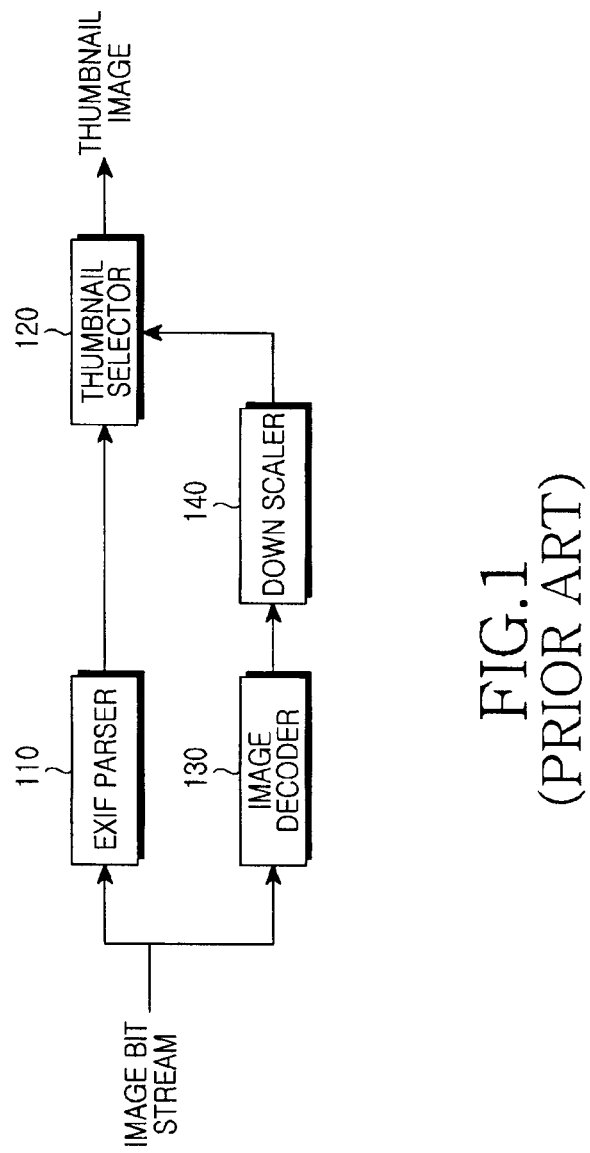
FIG. 1 is a block diagram of a conventional thumbnail image generator.
Figure 2:
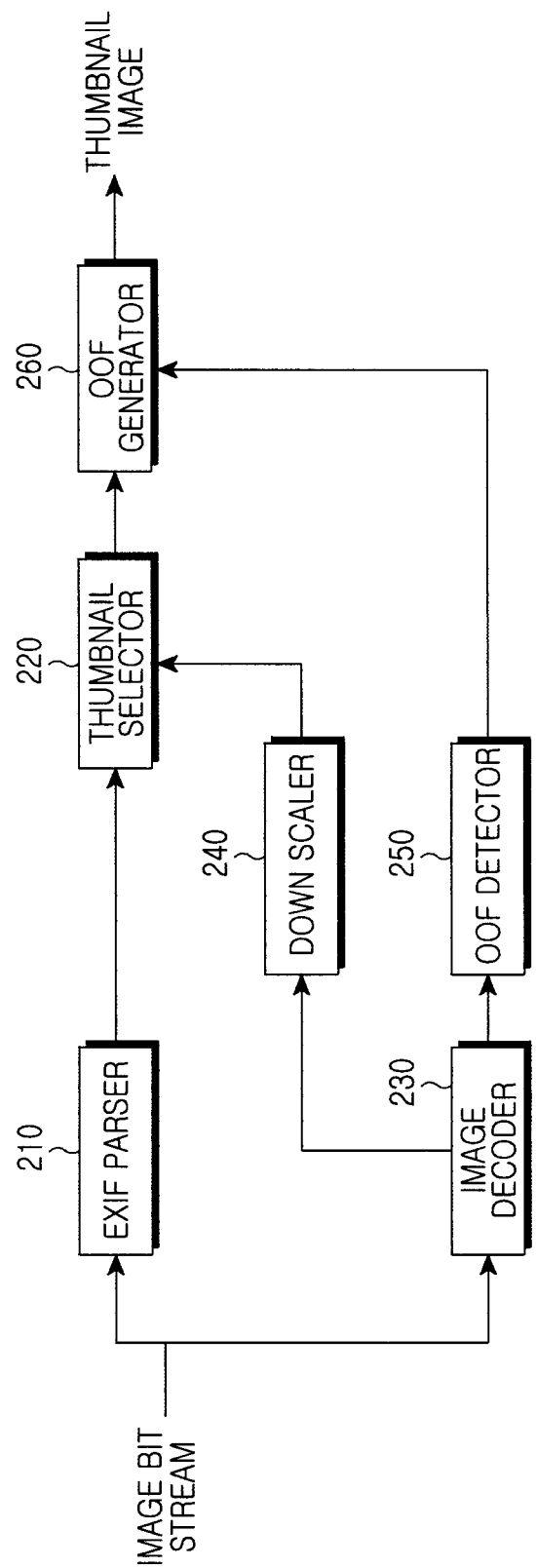
FIG. 2 is a block diagram of a thumbnail image generator according to an exemplary embodiment of the present invention.

FIG. 2 is a block diagram of a thumbnail image generator according to an exemplary embodiment of the present invention. Referring to the example shown in FIG. 2, the thumbnail image generator includes an EXIF parser 210, a thumbnail selector 220, an image decoder 230, a down scaler 240, an OOF detector 250, and an OOF generator 260.

The EXIF parser 210 extracts a thumbnail image from EXIF information about a received image.

The thumbnail selector 220 then selects the thumbnail image extracted from the EXIF information, or a thumbnail image generated by image decoding. In general, in the presence of the thumbnail image extracted from the EXIF information, the thumbnail selector 220 outputs the thumbnail image extracted from the EXIF information, or otherwise, the thumbnail selector 220 outputs the thumbnail image created by image decoding.

The image decoder 230 decompresses a compressed image such as a JPEG image. It is to be understood that the present invention is not limited in scope to JPEG images being decompressed by the image decoder.

In the absence of the thumbnail image extracted from the EXIF information, the down scaler 240 scales down the size of the decoded image, thereby creating the thumbnail image.

The OOF detector 250 measures the OOF degree of the decoded image. The OOF generator 260 may be proportional in that the OOF generator 260 gives as much of an OOF effect as the OOF degree measurement to the received thumbnail image.

A description will now be made of a thumbnail image generation operation in the thumbnail image generator according to an exemplary embodiment of the present invention in accordance with FIG. 3.

Figure 3:
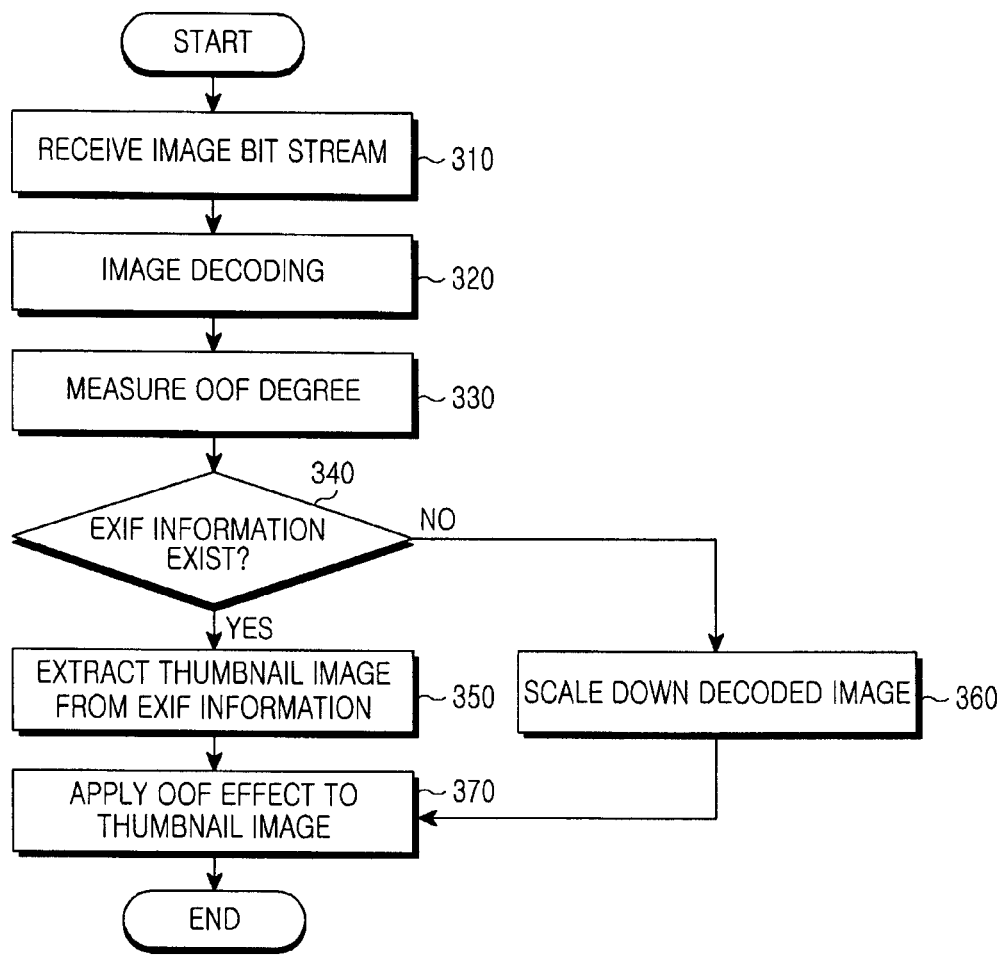
FIG. 3 is a flowchart illustrating an example of a thumbnail image generation operation according to an exemplary embodiment of the present invention.

FIG. 3 is a flowchart illustrating an exemplary thumbnail image generation operation according to an exemplary embodiment of the present invention.

Referring now to FIG. 3, upon receipt of an image bit stream in step 310, the image decoder 230 decompresses the compressed image data in step 320. In step 330, the OOF detector 250 measures the degree to which is the image is out of focus (referred herein to as "OOF degree"), which will be described subsequently in more detailed.

In step 340, there is a determination as to whether or not there is EXIF information regarding the image data. In the presence of the EXIF information, the EXIF parser 210 extracts a thumbnail image from the EXIF information in step 350 and in step 370, the OOF generator 260 applies as much of an OOF effect to the thumbnail image as the OOF degree.

On the other hand, in the absence of the EXIF information in step 340, the down scaler 240 generates a thumbnail image by scaling down the size of the decoded image in step 360 and the OOF generator 260 applies an OOF effect according to the OOF degree to the thumbnail image in step 370.

A exemplary method for detecting the OOF degree of an image in the OOF detector 250 will be described below with reference to FIG. 4.

Figure 4:
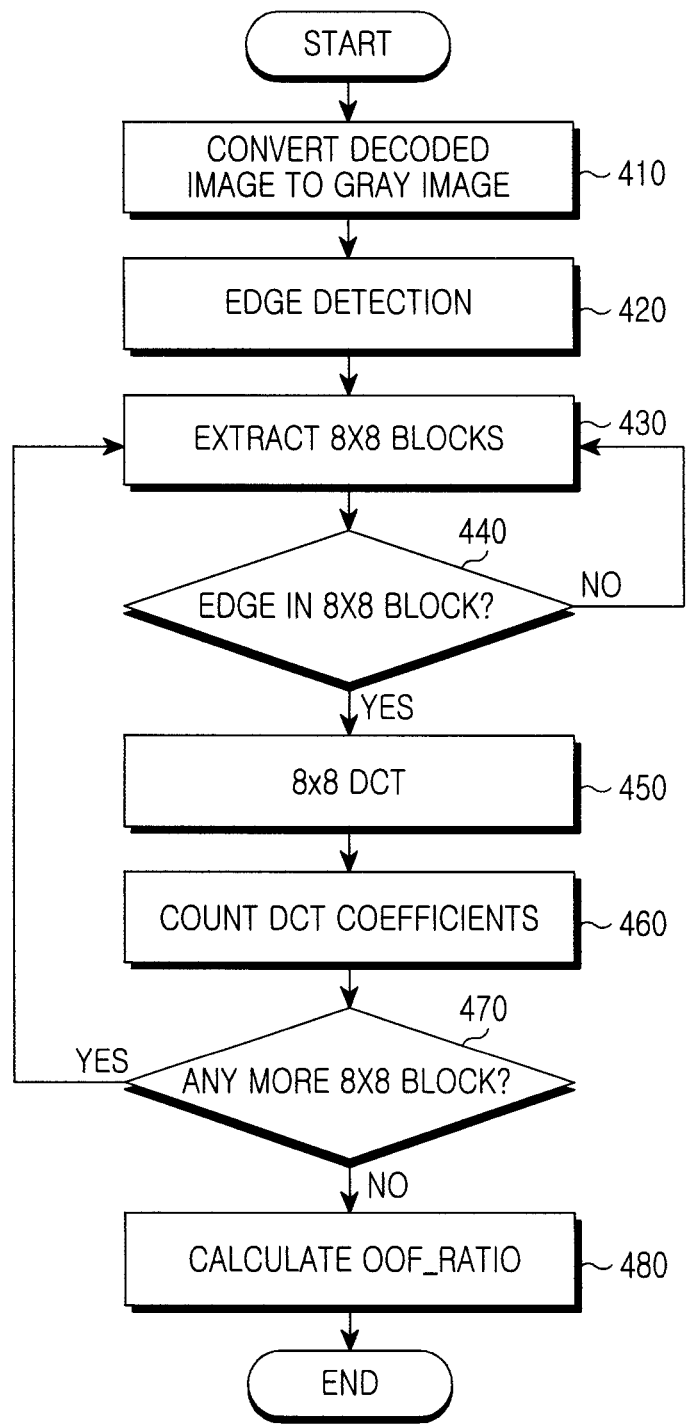
FIG. 4 is a flowchart illustrating an exemplary operation for measuring the OOF degree of an image according to an exemplary embodiment of the present invention.

FIG. 4 is a flowchart illustrating an operation for measuring the OOF degree of an image according to an exemplary embodiment of the present invention.

Referring to FIG. 4, a decoded image is converted to a Gray image in step 410. An image is generally represented in three colors, Red (R), Green (G) and Blue (B), and a Gray image of the RGB image is obtained by averaging the RGB values of pixels.

In step 420, edge detection is performed. In accordance with an exemplary embodiment of the present invention, 'differential edge detection' is used for the edge detection, expressed as $$D(i, j) = CLIP255\left(\sqrt{\frac{DH(i, j) + DV(i, j)}{128}}\right) \quad (1)$$

$$DH(i, j) = (2I(i, j) - 2I(i+1, j) + 2I(i, j+1) - 2I(i+1, j+1))^2$$

$$DV(i, j) = (-2I(i, j) - 2I(i+1, j) + 2I(i, j+1) + 2I(i+1, j+1))^2$$

where CLIP255(x) is a predetermined function. CLIP255(x) is a function that outputs 255 as x if x is larger than 255, outputs 0 as x if x is less than 0, and outputs x simply if x is 0 to 255. i and j denote column and row positions, respectively in a two-dimensional image pixel coordinate system. That is, DH(i,j) is the differential edge value of a pixel position (i,j). I(i,j) denotes the pixel value of the pixel position (i,j).

The edge detection of step 420 is not limited to the above method and any other edge detection scheme is also available.

In step 430, an edge image resulting from the edge detection is divided into 8×8 blocks. It is determined whether there is an edge in an 8×8 block in step 440. If there is an edge, a first count EDGE_COUNT is increased by 1, expressed as $$EDGE\_COUNT = EDGE\_COUNT + 1 \quad (2)$$

where EDGE_COUNT is the first count which is set to an initial value 0 in edge detection and then is increased by 1 each time an edge is detected in an 8×8 block.

Still referring to FIG. 4, DCT is performed on the 8×8 block in step 450 and DCT coefficients are counted in step 460. Herein, not total DCT coefficients but only the DCT coefficients of a high frequency area are counted. Let a horizontal frequency axis be denoted by i and a vertical frequency axis be denoted by j. Then the coordinate positions of DCT coefficients satisfying the condition described by equation (3) are counted.

$$i+j \geq \text{DCT\_REGION}, (0 \leq \text{DCT\_REGION} < 16, 0 \leq i < 8, 0 \leq j < 8) \qquad (3)$$

Figure 5:
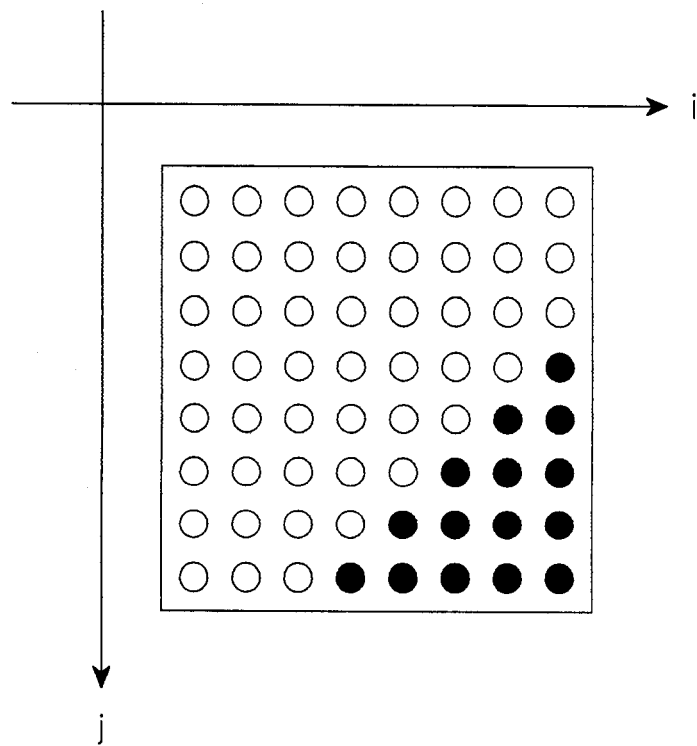
FIG. 5 is an exemplary view of the coordinate positions of Discrete Cosine Transform (DCT) coefficients when DCT_REGION is 12 during the OOF degree measuring operation according to an exemplary embodiment of the present invention.

With regard to eqn (3) and step 460, FIG. 5 is an exemplary view of the coordinate positions of DCT coefficients when DCT_REGION is 12 during the OOF degree measuring operation according to an exemplary embodiment of the present invention.

Referring to FIG. 5, when the DCT_REGION is 12, coordinates whose (i+j) values are equal to or larger than 12 are counted. The number of (i,j) values determined by DCT_REGION is defined as a second count DCT_COUNT. In the illustrated case of FIG. 5, the DCT_COUNT is 15. DCT_REGION is set arbitrarily for implementation of the exemplary embodiment of the present invention. DCT_REGION can be 0 to 15, as in equation (3). For efficient implementation of the present invention, DCT_REGION is preferably 12 as in FIG. 15.

Then the number of pixel positions (i,j) for which DCT coefficients are not 0s in the area satisfying equation (3) is counted as a third count.

$$\text{OOF\_COUNT}(i,j) = \text{OOF\_COUNT}(i,j) + 1 \qquad (4)$$

where OOF_COUNT(i,j) is the third count which is set to an initial value 0 in edge detection and increases according to equation (4).

It is then determined whether there is another 8×8 block in step 470. In the presence of another 8×8 block, the procedure returns to step 430. In the absence of any more 8×8 blocks, the OOF_RATIO is calculated in step 480.

When steps 430 to 460 are completed on an 8×8 block basis for the entire image, OOF_COUNT(i,j) indicates an OOF degree. Then an OOF weight is computed using OOF_COUNT(i,j) by $$\text{OOF\_RATIO} = 1 - ((\Sigma_{i,j}(\text{OOF\_COUNT}(i,j)/\text{EDGE\_COUNT}))/\text{DCT\_COUNT}), i+j \geq \text{DCT\_REGION} \qquad (5)$$

where OOF_RATIO is a parameter indicating an OOF degree. OOF_RATIO is between 0 and 1. If OOF_RATIO is small, this implies that the OOF degree is low and if OOF_RATIO is large, this implies that the OOF degree is high. In other words, an image with a large OOF_RATIO has a high OOF degree.

Now a method for applying an OOF degree to a thumbnail image will be described. After a thumbnail image is obtained and OOF_RATIO is computed, an OOF degree is applied to the thumbnail image according to OOF_RATIO.

Figure 6:
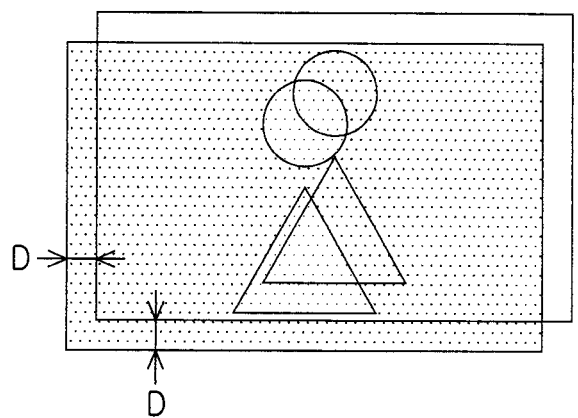
FIG. 6 is an exemplary view illustrating a method for applying an OOF effect to a thumbnail image according to an exemplary embodiment of the present invention.

Although an 'image blurring filter' is usually used to generate an OOF image, this method requires a large volume of computation and is ineffective in a small image like a thumbnail. Hence, the OOF degree applying method illustrated in FIG. 6 will be adopted. FIG. 6 is an exemplary view illustrating a method for applying an OOF effect to a thumbnail image according to an exemplary embodiment of the present invention. Referring to the example shown in FIG. 6, a thumbnail image shifted by D from an original thumbnail image is overlaid on the original thumbnail image. D is given as $$D = \text{ROUND\_OFF}(\text{BIAS} \times \text{OOF\_RATIO}) \qquad (6)$$

where BIAS is an integer constant indicating an OOF application degree, chosen appropriately according to the size of the thumbnail image, and ROUND_OFF(x) is a function for outputting the largest integer less than x, for the input of x.

Then an OOF-applied thumbnail image is acquired by $$\text{OOF\_TI}(i,j) = \text{CLIP255}(\text{TI}(i,j) + W \times \text{TI}(i+D, j+D)) \qquad (7)$$

where OOF_TI(i,j) denotes the pixel value of a position(i,j) in the OOF-applied thumbnail image and TI(i,j) denotes the pixel value of the position(i,j) in the thumbnail image. W is a weight being 0 to 1, and preferably 0.5 in this example, to achieve a most effectively OOF-applied image. A person of ordinary skill in the art should understand and appreciation that the claimed invention is not limited to the aforementioned values.

As is apparent from the above description, the present invention advantageously enables a user to detect OOF information about an original image from its thumbnail so that he can select, amend, and delete an image fast and effectively without additional manipulation.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents. For example, it is possible that a different block size can used, and while it is preferable that the dimensions form an (8×8) block, the invention is not strictly limited to 8×8 or an equal pair of numbers.

What is claimed is:

1. A method for generating a thumbnail image, comprising:
   (a) decoding an input image;
   (b) measuring a single Out-Of-Focus (OOF) value representing a degree of OOF of the entire decoded image;
   (c) determining whether or not the decoded image includes EXchangeable Image File (EXIF) information about the input image;
   (d) calculating, a distance based on the single measured OOF value of the entire decoded image in (b);
   (e) extracting a thumbnail image from the EXIF information and generating an OOF effect-applied thumbnail image by overlaying a thumbnail image shifted by the calculated distance on the extracted thumbnail image, in a presence of the EXIF information as determined in (c); and
   (f) generating a thumbnail image by scaling down the decoded image at a down scaler and generating an OOF effect-applied thumbnail image by overlaying a thumbnail image shifted by the calculated distance on the generated thumbnail image, in an absence of the EXIF information as determined in (c).

2. The method of claim 1, wherein the measurement of the OOF value in (b) includes:
   converting the decoded image to a grayscale image;
   (ii) performing edge detection on the grayscale image;
   (iii) dividing an edge image obtained by the edge detection into blocks and counting a number of blocks with edges as a first count;
   (iv) performing a Discrete Cosine Transform (DCT) on the blocks and counting the number of DCT coefficients as a second count;
   (v) counting a number of coordinate positions with DCT coefficients being non-zeros in the blocks as a third count; and
   (vi) calculating the OOF value using the first, second and third counts.

3. The method of claim 2, wherein the blocks comprise 8×8 blocks.

4. The method of claim 2, wherein the conversion in (i) includes converting the decoded image to the grayscale image by averaging Red (R), Green (G), Blue (B) values of pixels.

5. The method of claim 2, wherein the edge detection in (ii) includes performing differential edge detection on the grayscale image according to the following equation, $$D(i, j) = CLIP255\left(\sqrt{\frac{DH(i,j) + DV(i,j)}{128}}\right) \quad (8)$$

$$DH(i,j) = (2I(i,j) - 2I(i+1,j) + 2I(i,j+1) - 2I(i+1,j+1))^2$$

$$DV(i,j) = (-2I(i,j) - 2I(i+1,j) + 2I(i,j+1) + 2I(i+1,j+1))^2$$

wherein CLIP255( ) is a predetermined function, CLIP255(x) is a function that outputs 255 as x, when x is larger than 255, and outputs 0 as x, when x is less than 0, and outputs x when x ranges from 0 to 255, and wherein i and j denote column and row positions, respectively in a two-dimensional image pixel coordinate system, DH(i,j) is a differential edge value of a pixel position (i,j), and I(i,j) denotes a pixel value of the pixel position (i,j).

6. The method of claim 2, wherein the first count is set to an initial value of 0 when the edge detection is performed in (ii).

7. The method of claim 2, wherein the second count is set to an initial value of 0 when the edge detection is performed in (ii).

8. The method of claim 2, wherein the counting in (iv) to obtain the second count comprises counting a number of DCT coefficients in an area corresponding to (i,j) coordinates satisfying the following equation:

$$i+j \geq DCT\_REGION, (0 \leq DCT\_REGION < 16, 0 \leq i < 8, 0 \leq j < 8) \quad (9)$$

where DCT_REGION is set arbitrarily to select a high frequency area, i denotes a horizontal frequency axis, and j denotes a vertical frequency axis.

9. The method of claim 2, wherein the third count in (v) is set to an initial value of 0 when the edge detection is performed.

10. The method of claim 2, wherein the OOF value calculation in (vi) comprises calculating the OOF value according to the following equation, OOF_RATIO=1−(Σ$_{i,j}$(OOF_COUNT(i,j)/EDGE_COUNT))/DCT_COUNT), $$i+j \geq DCT\_REGION \quad (10)$$

where OOF_RATIO denotes the OOF value, OOF_COUNT(i,j) denotes the third count of (i,j) coordinates, EDGE_COUNT denotes the first count, and DCT_COUNT denotes the second count.

11. The method of claim 1, wherein the distance is calculated based on the OOF value according to the following equation, $$D=ROUND\_OFF(BIAS \times OOF\_RATIO) \quad (11)$$

where D denotes the distance calculated based on the OOF value, BIAS denotes an integer constant indicating an OOF application degree, OOF_RATIO denotes the OOF value, and ROUND_OFF(x) is a function for outputting a largest integer less than x, for the input of x.

12. The method of claim 11, wherein the OOF effect-applied thumbnail image generation comprises generating the OOF effect-applied thumbnail image according to the following equation, $$OOF\_TI(i,j)=CLIP255(TI(i,j)+W \times TI(i+D,j+D)) \quad (12)$$

where OOF_TI(i,j) denotes a pixel value of a position(i,j) in the OOF effect-applied thumbnail image, TI(i,j) denotes a pixel value of the position(i,j) in the thumbnail image, and W comprises a weight from 0 to 1.

13. The method of claim 12, wherein W comprises 0.5.

14. An apparatus for generating a thumbnail image, comprising: an EXchangeable Image File (EXIF) parser for extracting a thumbnail image from EXIF information about an input image;
a thumbnail selector for selecting one of the thumbnail image extracted from the EXIF information and a thumbnail image generated by image decoding;
an image decoder for decoding a compressed image to a decompressed image;
a down scalar for generating the thumbnail image by scaling down the size of the decoded image, in an absence of a thumbnail image extracted from the EXIF information;
an Out-Of-Focus (OOF) detector for measuring a single OOF value representing a degree of OOF of the entire decoded image; and an OOF generator for calculating a distance based on the single measured OOF value of the entire decoded image and generating an OOF effect applies thumbnail image by overlaying a thumbnail image shifted by the calculated distance on the original thumbnail image selected by the thumbnail selector.

15. An apparatus for generating a thumbnail image with Out-of-focus information, comprising:
means for decoding an input image;
means for measuring a single Out-Of-Focus (OOF) value representing a degree of OOF of the entire decoded image;
means for determining whether or not the decoded image includes EXchangeable Image File (EXIF) information about the input image;
means for calculating a distance based on the single measured OOF value of the entire decoded image;
means for extracting a thumbnail image from the EXIF information and generating an OOF effect-applied thumbnail image by overlaying a thumbnail image shifted by the calculated distance on the extracted thumbnail image, in a presence of the EXIF information; and
means for generating a thumbnail image by scaling down the decoded image at a down scaler and generating an OOF effect-applied thumbnail image by overlaying a thumbnail image shifted by the calculated distance on the generated thumbnail image in an absence of the EXIF information.

16. The apparatus according to claim 15, wherein the OOF value measurement includes:
means for converting the decoded image to a grayscale image;
means for performing edge detection on the grayscale image;
means for dividing an edge image obtained by the edge detection into blocks and counting a number of blocks with edges as a first count;
means for performing Discrete Cosine Transform (DCT) on the blocks and counting the number of DCT coefficients as a second count;
means for counting the number of coordinate positions with DCT coefficients being non-zeros in the blocks as a third count; and means for calculating the OOF value using the first, second and third counts.

17. The apparatus according to claim 16, wherein the blocks comprise 8×8 blocks.

18. The apparatus of claim 14, wherein the OOF effect applied comprises generating an OOF effect-applied thumbnail image by overlaying a thumbnail image shifted by a distance calculated based on the OOF value of an original thumbnail image.

* * * * *

UNITED STATES PATENT AND TRADEMARK OFFICE
CERTIFICATE OF CORRECTION

PATENT NO. : 8,483,503 B2  
APPLICATION NO. : 12/360180  
DATED : July 9, 2013  
INVENTOR(S) : Kwang-Pyo Choi et al.

Page 1 of 1

It is certified that error appears in the above-identified patent and that said Letters Patent is hereby corrected as shown below:

Item 73 on the Title Page should read as follows:  
--...Samsung Electronics Co., Ltd.,...--

In the Claims:

Column 6, Claim 2, Line 56 should read as follows:  
--...(i) converting the decoded image...--

Column 8, Claim 14, Line 19 should read as follows:  
--...a down scaler for generating...--

Column 8, Claim 14, Lines 27-28 should read as follows:  
--...an OOF effect-applied thumbnail image...--

Signed and Sealed this  
Tenth Day of September, 2013

Teresa Stanek Rea  
*Acting Director of the United States Patent and Trademark Office*